June 9, 1964
P. W. DILLON ETAL  3,136,835
METHOD AND MEANS FOR EQUALIZING THE HEAT
BALANCE WITHIN AN ELECTRIC FURNACE
Filed Aug. 3, 1961
2 Sheets-Sheet 1
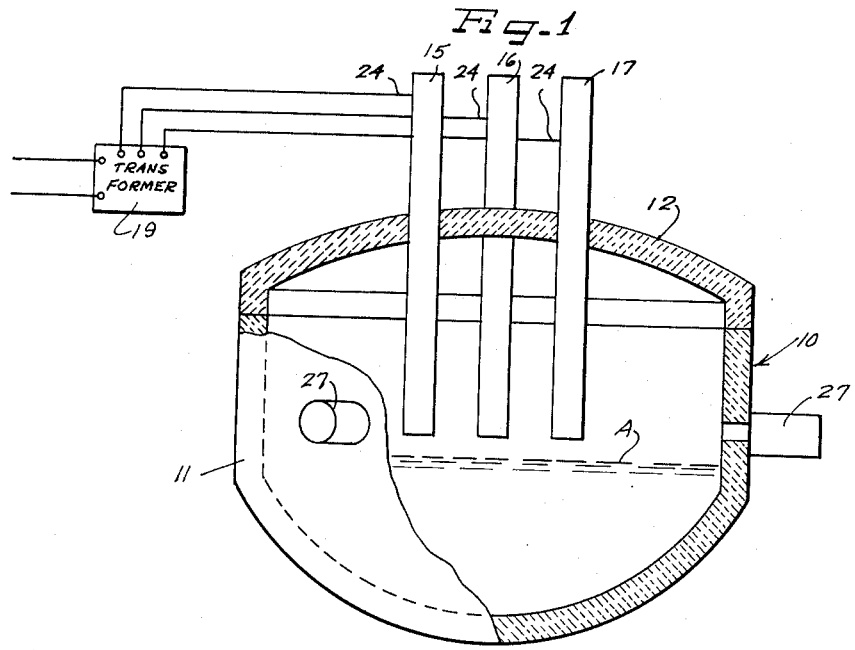
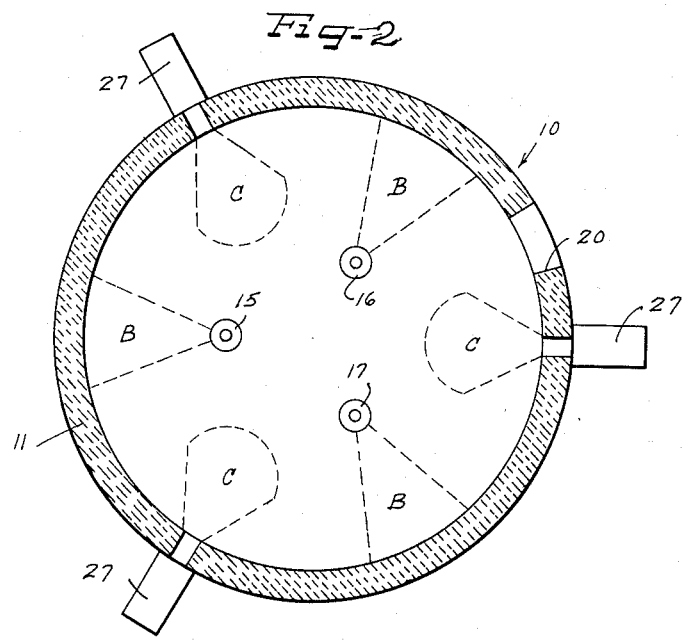
INVENTORS
Paul W. Dillon
Charles G. Robinson
BY
ATTORNEYS

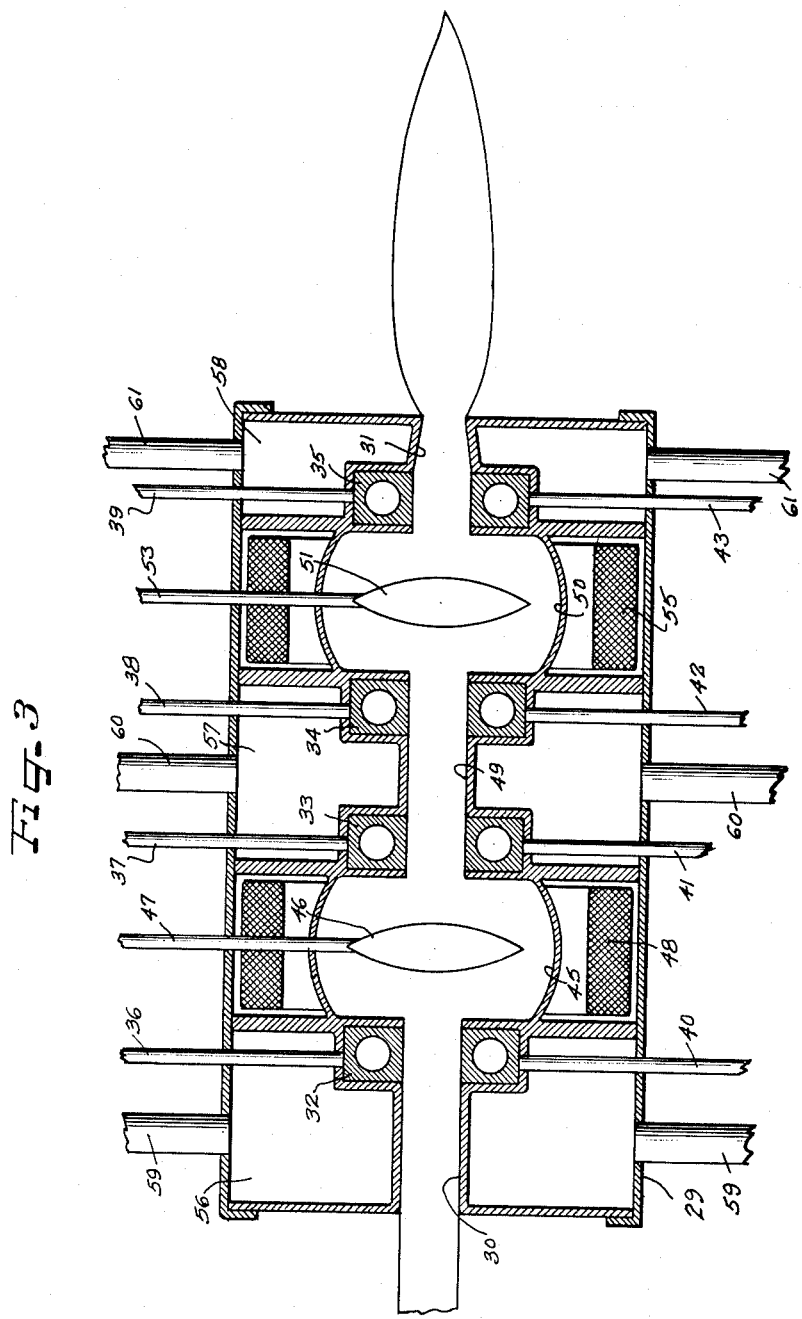

3,136,835
METHOD AND MEANS FOR EQUALIZING THE HEAT BALANCE WITHIN AN ELECTRIC FURNACE
Paul W. Dillon and Charles G. Robinson, Sterling, Ill., assignors to Northwestern Steel and Wire Company, Sterling, Ill., a corporation of Illinois
Filed Aug. 3, 1961, Ser. No. 129,017
2 Claims. (Cl. 13—9)

This invention relates to a method and apparatus for melting ferrous metals and more particularly relates to a method and means for producing equal heat balance within an electric furnace.

In the melting of ferrous metals in electric furnaces, the multi-phase electric furnace of the three electrode type has been developed in an effort to equalize the heat balance within the furnace. This furnace is generally in the form of a cylindrical vessel having a rounded bottom, lined with refractories, and having a roof or top which is readily removable. Three cylinders of graphite extend downwardly through the roof and convey electric power from a multi-phase transformer into a melting zone within the furnace, where arcing occurs when the ends of the graphite columns are moved downwardly to come into contact with the materials to be melted in the melting zone of the furnace.

With such furnaces the arcs which flow from the ends of the electrodes of the metal are distorted or blown toward the furnace wall, because of the Maxwell effect of the current in the circuit. This results in an uneven heat flow in the furnace.

Efforts have been made to achieve a more perfect heat flow in multi-phase furnaces by restricting the power feed into the center phase, by lengthening the circuit and thereby inducing more reactance.

Other efforts to produce balanced heat flow have been to restrict the phase having the lesser amount of impedance by the use of ferrous rings around the conductors feeding the electrodes.

While these efforts have improved the heat balance, they have not entirely remedied the undesirable conditions of unequal heat balance in electric furnaces.

The principal objects of the present invention, therefore, are to provide a simplified form of method and means for equalizing the heat balance within an electric furnace by projecting B.t.u. energy within the cold areas of a direct arc furnace.

A further object of the invention is to improve upon the electric furnaces heretofore in use by controlling the heat balance within the furnace by plasma arc burners operated independently of the arc power for energizing the electrodes of the furnace.

Still another object of the invention is to decrease the melting time of electric furnaces for any given weight of material, by uniformly distributing the B.t.u. energy in the furnace by the cooperation of plasma arc burners with the electrodes of the furnace.

Still another and important object of the invention is to control the atmosphere within an electric furnace by the use of arc plasma burners utilizing a selected gas for a required atmosphere within the furnace.

These and other objects of the invention will appear from time to time as the following specification proceeds and with reference to the accompanying drawings wherein:

FIGURE 1 is a diagrammatic view of a multi-phase electric furnace incorporating the process of the present invention and diagrammatically showing the heating vessel in vertical transverse section;

FIGURE 2 is a diagrammatic horizontal sectional view taken through the furnace shown in FIGURE 1 showing the location of the arc plasma burners with respect to the furnace electrodes and generally illustrating the heating patterns of the arcs flowing from the ends of the electrodes and the plasma flames of the arc plasma burners; and FIGURE 3 is a diagrammatic view of an illustrative form of arc plasma burner that may be utilized in carrying out the principles of the invention.

In the embodiment of the invention illustrated in the drawings, we have diagrammatically shown in FIGURE 1 a multi-phase arc-type electric furnace 10, of a conventional construction, so not herein shown or described in detail.

The furnace 10 comprises a vessel 11 having a cylindrical wall, a rounded bottom and a removable roof 12. The inside of the vessel 11 and roof 12 are lined with refractories of the magnesite and alumina composites.

Extending downwardly through the roof are three round cylinders of graphite 15, 16 and 17, shown as being hollow and which convey the electric power from a multi-phase transformer 19, diagrammatically shown in FIGURE 1, and form the electrodes of the furnace and cause arcing to occur when the graphite columns are energized and their ends are moved downwardly into the furnace, to come into contact with the electrical conductive materials to be melted.

The graphite columns may be moved vertically to control the arc lengths, by an electric motor type winch (not shown) commonly used for this purpose.

The furnace is diagrammatically shown in FIGURE 2 as having a charge opening 20 closed by a door (not shown). It should here be understood that any conventional form of charging means may be provided for the furnace, which may either be a door charge type of charging means, or a top charge type of charging means to accommodate a charge of material to be melted to be injected into the heating chamber, such a charge in the heating chamber being indicated by reference character A in FIGURE 1.

The physical characteristics of the arcs drawn from the electrodes 15, 16 and 17 are indicated by reference characters B in FIGURE 2, showing the arcs flowing from the ends of the electrodes, blown toward the furnace wall because of the Maxwell effect of the current in the circuit.

The multi-phase arc furnace so far generally described is a conventional form of furnace with the arc patterns directed toward the wall of the furnace and cold spots between the arc patterns. In order to equalize the heat balance within the furnace, caused by the blowing of the arcs toward the wall of the furnace by the Maxwell effect of the current in the furnace, we have provided three arc plasma burners 27 in the wall of the furnace, equally distributed between the electrodes 15, 16 and 17 and the arc patterns B and having flame patterns generally indicated by reference characters C, to thereby project B.t.u. energy in the cold areas within the furnace.

An illustrative form of plasma arc burner is diagrammatically shown in FIGURE 3 of the drawings and operates on the principle of creating a plasma by heating gas by electrical means, such as an arc, until the main kinetic energy of the gas particles becomes comparable to the ionization potential of the gas. This will cause mutual collisions of the gas particles and will result in a cascading ionization of the gas. Since ionization potentials are always several volts, such effects are important at kinetic temperatures of several electron volts with the result that the threshold temperature of the plasma may range up to tens or hundreds of millions of degrees F.

As for example, a 3000 kilowatt burner using a gas in the form of atmospheric air, with an air flow 1.4 pounds per second or 19.3 cubic feet at ambient temperatures of 60 degrees to 70 degrees F., will produce temperatures 6000 degrees Rankine, with an expansion factor of 3.2 times, and a velocity of 1650 feet per second.

Arc plasma burners may be of various forms. We have preferably diagrammatically shown a form of multi-stage arc plasma arc burner having a body 29 having a gas inlet 30 leading thereinto from one end thereof, and a converging outlet nozzle 31, for the plasma flame leading from the opposite end thereof. Coaxial with the inlet 30 and spaced along the body 29 toward the nozzle 31 are four hollow annular electrodes 32, 33, 34 and 35 having pipes 36, 37, 38 and 39 respectively leading thereinto and pipes 40, 41, 42 and 43 leading therefrom. The pipes 36 to 43 inclusive serve to conduct electrical power to the respective electrodes 32, 33, 34 and 35 and also serve to conduct coolant to the hollow interior of said electrodes. Between the electrodes 32 and 33 is an enlarged diameter chamber 45 having a hollow electrode 46 therein energized through a pipe 47 and supplied with coolant through said pipe. Surrounding the chamber 45 and spaced radially therefrom is a magnetic coil 48 energized through direct current voltage and so wound as to produce a toroidal magnetic field and aid in creating a toroidal motion and collision of the gas particles.

A restricted passageway 49 leads from the chamber 45 and has communication with an enlarged diameter chamber 50 between the electrodes 34 and 35. The chamber 50 has a hollow electrode 51 therein energized and supplied with coolant through a pipe 53.

A magnetic coil 55 encircles the chamber 50 to create a toroidal magnetic field, like the magnetic field created by the magnetic coil 48 and to effect a toroidal motion of the gases as they pass through the hollow annular electrode 35 and out the nozzle 31 in the form of a plasma flame.

The body 29 in turn is maintained cool by annular coolant chambers 56, 57 and 58 spaced therealong and supplied with coolant through coolant passageways 59, 60 and 61 entering and leaving said coolant chambers to accommodate the circulation of coolant therethrough.

The electrodes 32, 33, 34 and 35, serve as cathodes and may be made from carbon or tungsten. The electrodes 46 and 51 serve as anodes and may be made from a copper alloy.

The gas entering the body 29 through the passageway 30 thus flows through electrode 32 around electrode 46 in a toroidal path, through electrodes 33 and 34 around electrode 51 in a toroidal path and out through electrode 35 and nozzle 31 in the form of a plasma flame heated to temperatures of between 6000 to 10,000 degrees Rankine.

While air when passed through the arc zone will achieve temperatures of 6000 Rankine, due to the oxidation problems within the furnace produced by air when the graphite electrodes are extended into the furnace at their maximum and providing maximum surface area for oxygen attack, the use of air as a gas to create a plasma flame is restricted to metals where oxidation is not objectionable.

The various other low density gases which may be used to create a plasma flame are hydrogen, argon, nitrogen and carbon monoxide. Argon, nitrogen and carbon monoxide are preferred in the melting of ferrous metals, since they do not lend themselves readily to the release of free oxygen.

It should be understood that when arc plasma burners are utilized as a source of heat, particularly for melting ferrous metals, that there are no products of combustion, as in chemical flames, and the plasma provides a high speed flame particularly suitable for equalizing the heat balance within an electric furnace for melting large baths of metal, and that the high concentration of heat and energy in the plasma flame not only decreases the melting time for any given weight of material, but in cooperation with the electrodes, results in a higher and more evenly distributed B.t.u. rate in the furnace, with a resultant increase in the speed of melting.

It should also be understood that the electrodes 15 are energized independently of the plasma burners, making is possible to control the heat balance within the furnace to the desired extent and thereby making it possible to use either the arc plasma burners or the electrodes for heating and melting metal within the furnace.

It should further be understood that by the use of various types of gases for the transfer of heat energy in the furnace, the atmosphere of the furnace can be controlled to a most efficient atmosphere for the particular type of metal being melted, and to impart certain desired properties or to remove certain undesirable properties from the metal where required.

While we have herein shown and described one form in which our invention may be embodied, it may readily be understood that various variations and modifications of the invention may be attained without departing from the spirit and scope of the novel concepts thereof as defined by the claims appended hereto.

We claim as our invention:

1. The method of melting metals which comprises the steps of establishing a series of equally spaced arc zones in an electric furnace by generating a series of arcs between the electrodes and the charge within the furnace, and controlling the heat balance within the furnace by the projection of additional high velocity rapidly expanding B.t.u. energy in the form of plasma flames directed radially towards the center of the furnace into the cold areas of the furnace independently of the arcs formed by the electrodes, by ionizing low density ionizable gases by heating turbulently flowing gases by electric arcs and passing the gases through the arcs into the furnace radially toward the center thereof, at locations spaced between the arcs formed by the electrodes.

2. In an electric melting furnace, a melting vessel having a roof and a generally cylindrical wall depending therefrom, at least three electrodes leading through the roof of the vessel to a position adjacent a melting zone in the vessel and equally spaced about the melting zone and being in the form of graphite columns, energizing circuits to said electrodes to form and maintain confined arc zones between the tips of said electrodes and the charge within the furnace, and means for injecting rapidly expanding high velocity heat energy into the vessel into the cold spots between the confined arc zones, comprising a series of plasma arc burners mounted on the wall of the furnace equally spaced between the electrodes and extending therein and having nozzles directed radially toward the center of the furnace and ejecting rapidly expanding high velocity plasma flames radially into the melting zone between the confined arc zones.

References Cited in the file of this patent

UNITED STATES PATENTS

| | | |
|---|---|---|
| 1,912,560 | Wiles | June 6, 1933 |
| 2,862,099 | Gage | Nov. 25, 1958 |
| 2,927,142 | La Bate | Mar. 1, 1960 |

FOREIGN PATENTS

| | | |
|---|---|---|
| 558,775 | Belgium | July 15, 1957 |
| 866,106 | Great Britain | Apr. 26, 1961 |